May 20, 1924.

V. P. AUSBROOKS

FISHING TOOL

Filed Sept. 26, 1922

1,494,880

Villey P. Ausbrooks, INVENTOR.

BY Geo. P. Kimmel, ATTORNEY.

Patented May 20, 1924.

1,494,880

UNITED STATES PATENT OFFICE.

VILLEY P. AUSBROOKS, OF OILTON, OKLAHOMA.

FISHING TOOL.

Application filed September 26, 1922. Serial No. 590,698.

*To all whom it may concern:*

Be it known that I, VILLEY P. AUSBROOKS, a citizen of the United States, residing at Oilton, in the county of Creek and State of Oklahoma, have invented certain new and useful Improvements in Fishing Tools, of which the following is a specification.

This invention relates to fishing tools designed primarily for use in connection with the separated or detached elements of oil well drilling equipment, but it is to be understood that the tool can be employed for any purposes wherein it is found applicable, and the invention has for its object to provide a tool of such class, in a manner as hereinafter set forth, with means for not only straddling the detached element, of the equipment, which is to be removed, but also for guiding said element to a plurality of clamping members to be engaged and securely clamped thereby with the body portion of the tool, so as to prevent the separation of the secured element from the tool when the latter is withdrawn from the well.

Further objects of the invention are to provide a fishing tool for the purpose set forth which is simple in its construction and arrangement, strong, durable, compact, efficient and convenient in its use, readily set up and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

A fishing tool in accordance with this invention comprises a hollow tubular body portion 5, which is longitudinally slotted as at 6, and provided intermediate its ends with a transversely extending bolt 7, which constitutes a stop for the upper end of an expansible element 8, the latter being in the form of a coiled spring and arranged within the chamber 9, formed by the body portion 5. The wall of the chamber 9, at the lower portion thereof is tapered as indicated at 10, and which tapered portion is arranged above the lower terminus of the body portion 5, and provides a shifting means for a plurality of clamping members to be presently referred to.

Figure 1:
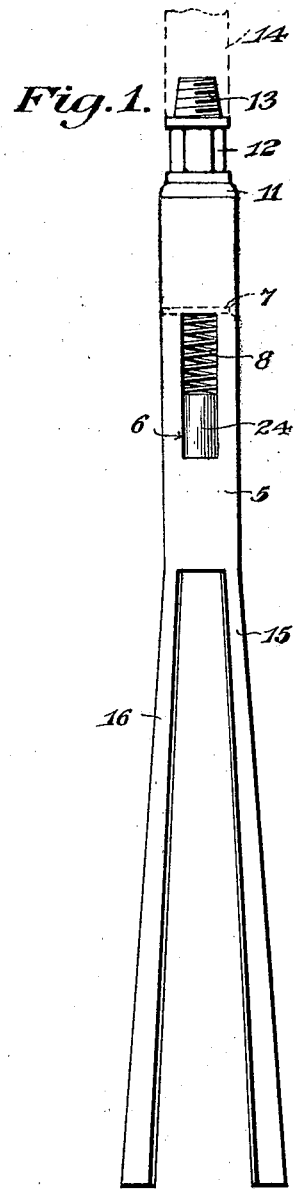
Figure 1 is an elevation of a fishing tool in accordance with this invention.

The upper terminus of the body portion 5, is contracted as at 11, and formed with a polygonal extension 12, the latter terminating in a cone-shaped peripherally threaded shank 13, for the purpose of coupling the tool to a line section 14, as indicated in dotted lines Figure 1. The lower terminus of the body portion 5, is formed of a substantially wide lower edge. Formed integral with the outer portion of said edge, at diametrically opposed points, is a pair of elongated oppositely disposed outwardly inclined spaced guide members 15, 16, and which are of greater length than the body portion 5. Each of the guide members, at any point throughout its length, is arcuate in transverse section and each of said members gradually increase in width throughout from said lower edge. The outwardly inclining of the members 15, 16, in opposite directions with respect to each other, and the gradual increasing in width of each member from its upper towards its lower end throughout, provides what may be termed a catching space for the object which is to be caught and with said catching space gradually increasing in area throughout from the upper to the lower ends of said members. As each of the members 15, 16, is formed integral with the outer portion of the lower edge, the said members are of a thickness materially less than the width of said lower edge. By setting up the guide members in a manner where they will be extended in opposite directions with respect to each other, that is to say, at an outward inclination, the openings formed between the side edges of said members gradually increase in width from said lower edge of the body portion 5 to the lower end of the said members 15, 16. The setting up of the catching space of gradually increasing area so that it will enlarge in a direction towards the lower ends of the members 15, 16, enables articles of varying sizes to be caught within the space to be engaged by a gripping or clamping element to be presently referred to.

The openings of gradually increasing width formed between the members 15, 16, permit of the entry of objects of varying sizes into the catching space.

Figure 2:
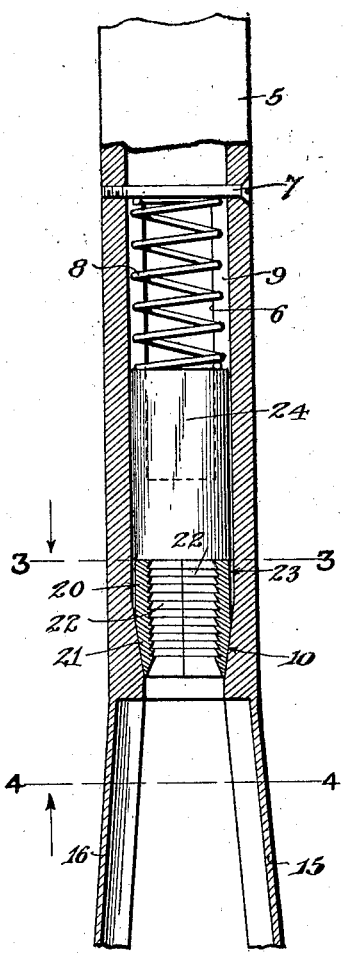
Figure 2 is a vertical sectional view broken away.
Figure 3:
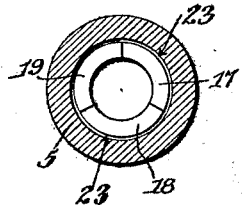
Figure 3 is a section on line 3—3, Figure 2.
Figure 4:
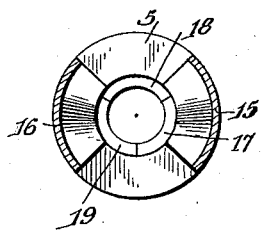
Figure 4 is a section on line 4—4, Figure 1.

Arranged within the chamber 9, formed by the body portion 5, is a series of clamping members as shown three in number, and which are indicated by the reference characters 17, 18 and 19, and each of these clamping members is quadrant shaped in cross section. The upper portion of the outer periphery of each of the clamping members is cylindrical as indicated at 20, and the lower portion of the outer periphery of each of said clamping members is beveled as at 21. The inner periphery of each of the clamping members is serrated or toothed as at 22, to provide a gripping face. The upper portion of each of the gripping members is set up in such a manner so that there will be a space, as indicated at 23, between the clamping members and that portion of the wall of the chamber 9, above the tapered portion 10, of said wall. That part of the periphery of each of the clamping members which is beveled rides against the tapered portion 10, of the wall of the chamber 9. The normal position of the clamping members, is as shown in Figure 2 of the drawings, and said clamping members are maintained in such position by the action of the expansible member 8, which bears against a cylindrical plunger 24, the latter engaging the upper edges of the clamping members. The clamping members are adapted to be shifted upwardly against the action of the expansible element or member 8, and when shifted upwardly within the chamber 9, can open relatively to each other, so that when the body portion 5, is moved upwardly, the tapered portion 10, of the wall of the chamber 9, riding against the beveled periphery of the clamping members, will shift these latter toward each other and maintain them in such position.

It will be assumed that the guide members 15, 16, have straddled a detached element of the oil well equipment, the said element is then directed to a vertical position, as the tool moves downwardly, and the end of said element will eventually enter the lower end of the chamber 9, which abuts against the clamping members, forcing the same upwardly against the action of the spring 8, and with the upper end of the element entering between the clamping members, due to the fact that when the clamping members are forced upwardly they will be separated with respect to each other, and after the detached element is positioned in the manner as stated, that is to say with its upper end positioned between the clamping members, the body portion 5, is shifted upwardly, which causes the tapered portion 10, of the wall of the chamber 9, to force the clamping members inwardly toward each other and around the upper end of the element, whereby the clamping members will grip the said upper end securely connecting the element with the body portion 5, so that when the tool is removed from the well, the element will be carried therewith.

The gripping action of the clamping jaws is assisted by means of the clamping member or spring 8.

From the foregoing description taken in connection with the accompanying drawings, a construction of fishing tool is set up which provides for the automatic gripping of a detached element within the well, so that the element can be removed therefrom, and it will be understood, that the construction is not limited to the details shown and described, as modifications with respect to the elements of the tool can be made without departing from the spirit of the invention.

What I claim is:—

1. A fishing tool comprising a hollow cylindrical body portion having a substantially wide lower edge, means in connection with the inner face of said body portion to provide in the latter a spring controlled gripping element for coupling a caught object with said body portion, and a pair of elongated oppositely disposed outwardly inclined spaced arcuate guide members integral with the outer portion of said edge at diametrically opposed points and disposed throughout at a permanent inclination with respect to said body portion, each of said guide members being of less thickness than the width of said wide lower edge and gradually increasing in width from the upper to the lower terminus thereof, each of said guide members further being arcuate in cross section at any point throughout its length thereby providing an object catching space gradually increasing in area throughout from the upper to the lower termini of said members, and said members so disposed to provide between the side edges thereof opposed openings gradually increasing in width from the upper to the lower termini of the members and providing entrances for said catching space.

2. A fishing tool comprising a hollow cylindrical body having means therein to provide a spring controlled gripping element for coupling a caught object with said body portion, and a pair of elongated oppositely disposed outwardly inclined spaced arcuate guide members integral with the lower edge of said body portion at diametrically opposed points and disposed throughout at a permanent inclination with respect to said body portion, each of said guide members gradually increasing in width from the upper to the lower terminus thereof and further being arcuate in cross section at any point throughout its length thereby providing an object catching space, said space gradually increasing in area throughout from the upper to the lower termini of said members, and said members so disposed to provide between the side edges thereof opposed openings gradually increasing in width from the upper to the lower termini of the members and providing entrances for said catching space.

In testimony whereof, I affix my signature hereto.

VILLEY P. AUSBROOKS.